F. CONRAD.
SYSTEM OF ELECTRICAL DISTRIBUTION.
APPLICATION FILED NOV. 8, 1911.
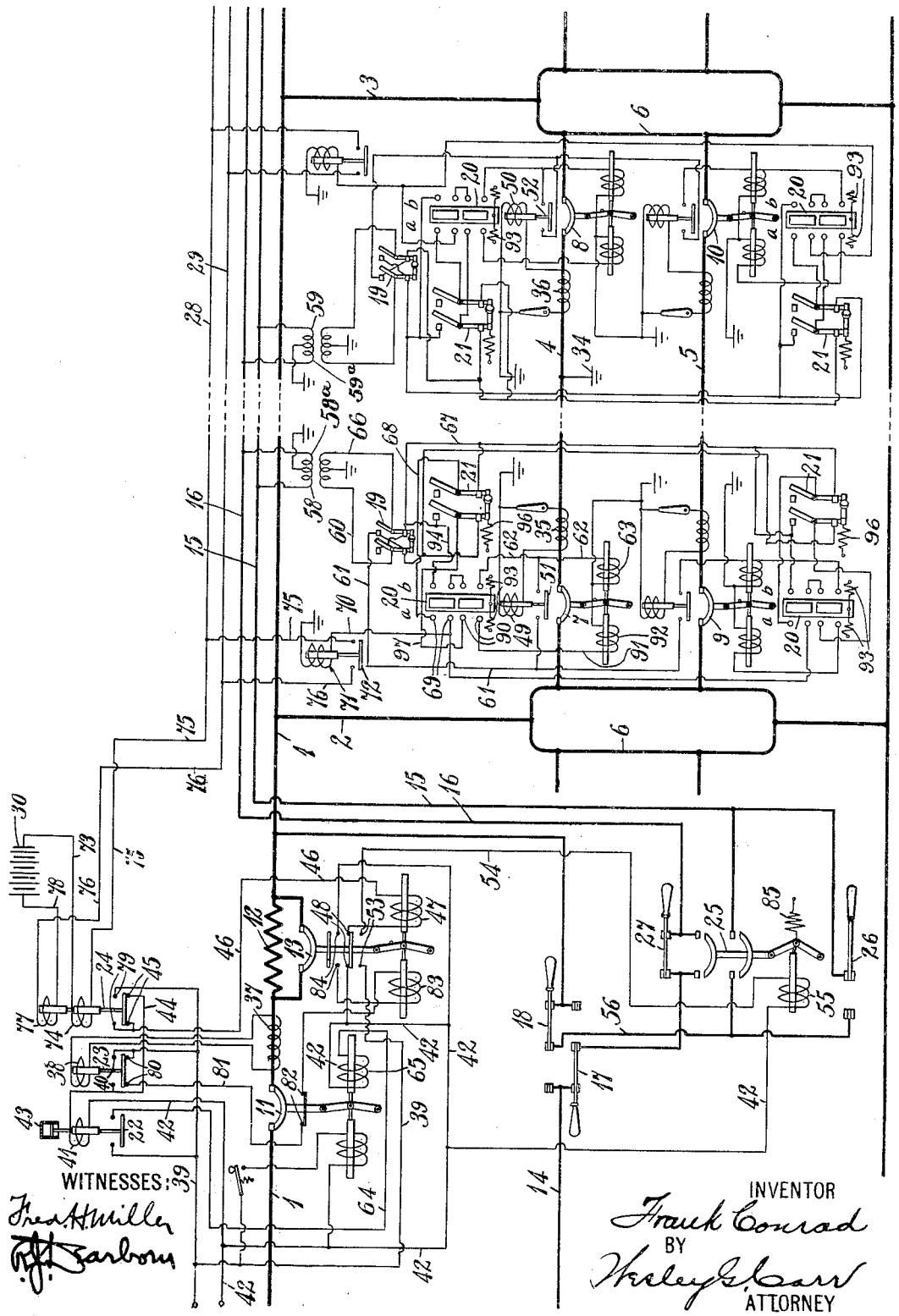
INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF ELECTRICAL DISTRIBUTION.

1,224,143. Specification of Letters Patent. Patented May 1, 1917.

Application filed November 8, 1911. Serial No. 659,185.

*To all whom it may concern:*

Be it known that I, FRANK CONRAD, a citizen of the United States, and a resident of Swissvale, in the county of Allegheny and State of Pennsylvania, have invented a new and useful Improvement in Systems of Electrical Distribution, of which the following is a specification.

My invention relates to systems of electric current distribution, and it has special reference to such systems as are adapted to supply power to the feeder and trolley circuits of electric railways.

The object of my invention is to provide a system of the class above indicated that shall embody automatic means for cutting out one or more sections of the trolley circuits under predetermined conditions, such as the occurrence of grounds on said sections, and automatic means for temporarily introducing resistance into the supply circuits of the systems not only while one or more defective sections are being excluded from the circuit, but also during the time when the sections are being reinserted.

In U. S. patent 1,138,637 filed December 31, 1908, by Harry P. Davis and myself, is shown and described a system of distribution which is especially adapted for the electrification of multi-track railway systems and which comprises a plurality of trolley line conductors divided into interconnected sections, feeder circuits being tapped into the various interconnecting conductors or bus bars at the ends of the sections. By this means, any section of the line may be cut out of the circuit by opening the circuit interrupters at its respective ends.

The system set forth also comprises automatic means for temporarily introducing resistance into the main feeder circuits when a ground or other trouble occurs anywhere on the line and means for tripping the line circuit breakers on which an overload exists during the time that the resistance is inserted in the feeder circuits.

When a system of the character just referred to operates to cut out a section, and after the damaged section is repaired, the circuit breakers at the ends of the section are closed by manually operated control switches, located at suitable stations along the line. Under these conditions, the circuit is sometimes completed while the ground still exists, which results in a dead short circuit upon the system, thereby subjecting the generators and switching apparatus to destructive electrical and mechanical strain.

According to my present invention, I provide automatic means for temporarily inserting resistance in the main feeder circuits before the circuit breakers are closed, and thereby avoid disturbances, which might otherwise occur. Moreover, excessive rises of current and voltage surges are also limited whereby the system and associated apparatus is not required to handle dangerously abnormal circuit conditions.

The single figure of the accompanying drawing is a diagrammatic view of a system of distribution embodying my invention.

For convenience and clearness in illustration, I have shown a single section of resistance located in the main feeder circuit and a single short-circuiting switch therefor, although a group of resistance sections and a series of switches, as shown in the Davis and Conrad patent above referred to, may be employed. Furthermore, I have shown only two trolley sections each comprising but two trolley conductors, while, in actual practice, a large number of sections will usually be employed and the number of trolley conductors will, of course, depend upon the number of tracks comprised in the railway system.

Referring to the diagram, energy may be supplied from any suitable grounded source (not shown) through main feeder conductor 1 and taps 2 and 3 to trolley conductors 4 and 5. Each trolley conductor is divided into a plurality of sections, the ends of which are tied together by bus bars 6 and adjacent to which they are provided with circuit interrupters 7, 8, 9 and 10.

The feeder circuit is provided with a main circuit interrupter 11 and a resistor 12 which is normally short circuited by a switch or circuit breaker 13. In addition to the main feeder 1, I provide an auxiliary grounded feeder 14 and a pair of control conductors 15 and 16, the latter of which may both be supplied with energy from either the main feeder or the auxiliary feeder, or one may be supplied from one feeder and one from the other, according to the positions occupied by selective switches 17 and 18.

Control stations are provided between trolley sections and are provided with manually operated control switches 19, 20 and 21.

The circuit breakers 11 and 13 are located in the main generating or control station which is also equipped with relay switches 22, 23 and 24, a circuit closing switch 25 for the control conductors 15 and 16, and short circuiting switches 26 and 27.

The control conductors 15, 16, 28 and 29 are substantially parallel to the trolley conductors 4 and 5 and the conductors 28 and 29 may also be used for telephone purposes, as set forth in my co-pending application, Serial No. 788,088, filed September 4, 1913, and assigned to the Westinghouse Electric & Manufacturing Company.

The operation of, and the circuit connections for, my improved system are as follows:

Assuming that the switching devices and circuit breakers occupy the positions shown in the drawing, the resistance section 12 being shunted and the section circuit breakers 7, 8, 9 and 10 being closed, if trolley conductor 4 is accidentally connected to ground, as indicated at 34, so that a short circuit occurs on the line, energy will immediately be supplied from the bus bars 6, through circuit interrupters 7 and 8 and the primary windings of series transformers 35 and 36, to ground. It is evident that energy will be supplied from the feeder conductor 1 to the bus bars 6 and from the adjacent trolley sections, through circuit interrupters and series transformers, to the grounded section. Consequently, the amount of current traversing the series transformers 35 and 36 will be excessive and the current traversing other circuit interrupters and series transformers in the vicinity may also be considerably greater than the normal current supplied through them for the operation of locomotives or other electric vehicles. For this reason, if the circuit breakers for each section are properly set to protect the said section against overload and other adverse conditions, not only the grounded trolley section 4, but many other sections, may obviously be excluded from the circuit if the circuit interrupters are directly responsive to abnormal currents which may or may not be of considerable duration.

In the system illustrated, the first effect of a ground or other cause of abnormal demand, on any section of the line, is to excessively energize a series transformer 37 which is connected in the feeder circuit 1 adjacent to the circuit breaker 11 and which supplies current to the magnet winding 38 of relay switch 23. When the relay switch is actuated, a control circuit is established from any suitable source, through conductor 39, contact terminals 40 of the relay switch and magnet winding 41 of relay switch 22 to conductor 42, which is connected to the opposite terminal of the source of supply. The relay switch 22, when energized, is raised in opposition to a dash pot 43 and, consequently, some time intervenes between the completion of the circuit through its coil 41 and the closing of the relay switch 22. In the meantime, energy is supplied through the relay switch 23, conductor 44, contact terminals 45 of relay switch 24, conductor 46, trip coil 47 of circuit breaker 13 and auxiliary control contact terminals 48 of the same circuit breaker to the line conductor 42. When coil 47 is energized, the breaker 13 is immediately opened and resistor 12 is inserted in the feeder circuit 1. The reduction of current in the feeder, which is effected by the introduction of the resistance, is sufficient to restore substantially normal conditions on all of the line circuit breakers, with the exception of circuit breakers 7 and 8 which are located at the respective ends of the grounded section 4.

As a result of the excessive current traversing the primary circuits of the series transformers 35 and 36, sufficient energy is supplied to the coils 49 and 50 to close the relay switches 51 and 52.

When circuit breaker 13 is opened, energy is supplied from control line conductor 39, through contact members 53, conductor 54 and closing coil 55 of switch 25, to opposite line conductor 42. As soon as switch 25 is closed, energy is supplied from feeder conductor 1, through switch 18, conductor 56 and switch 25 to control conductor 15. Inasmuch as the primary windings of transformers 58 and 59 are connected between the control conductor 15 and the ground and the primary windings of transformers 58ᵃ and 59ᵃ are connected between control conductors 16 and the ground, it is evident that transformers 58 and 59 are energized only when the resistor short-circuiting breaker 13 is open and the switch 25 is closed, while transformers 58ᵃ and 59ᵃ are supplied with energy at all times. As soon as current is supplied to the conductor 15, the secondary circuit of transformer 58 is completed through conductor 60, switch 19, conductor 61, relay switch 51, conductor 62, trip coil 63 of circuit breaker 7 to ground, the relay switch 51 being previously closed, as above indicated.

In a similar manner, the trip coil of the circuit breaker 8 is energized and both circuit breakers 7 and 8 are opened. By this means, the trolley section grounded at 34 is excluded from the circuit and the action is usually complete before the relay switch 22 has an opportunity to completely close. If, however, the trouble is so serious that the exclusion of the grounded section does not remedy the abnormal condition or the introduction of resistance does not produce sufficient reduction of the current, the relay switch 22 may be closed, in which case, energy is supplied from conductor 39, through relay 22, conductor 64 and trip coil 65 of the main circuit interrupter 11 to the negative conductor 42. Consequently, the circuit interrupter 11 is actuated to disconnect the main power supply from circuit.

The resistor 12 may be inserted at frequent intervals without affecting the operation of the system to any considerable extent, and emergencies necessitating the opening of the main line circuit interrupter 11 are very unlikely to occur.

As soon as the circuit breakers 7 and 8 are opened and the trolley section between them removed, the current traversing the coil 38 of relay switch 23 will be so far reduced as to permit the relay switch 23 to drop and establish a connection across contact terminals 80, thereby completing a circuit from conductor 39, through conductor 81, contact terminals 82 of circuit breaker 11, closing coil 83 of the circuit breaker 13 and auxiliary contacts 84 of the same circuit breaker to conductor 42. It is, therefore, evident that as soon as the grounded section is excluded from the circuit, the resistor 12 is again short circuited by the closing of the circuit breaker 13. The closing coil 55 of switch 25 is deënergized when the circuit breaker 13 is closed and the circuit closing switch 25 is opened by the spring 85, thereby deënergizing control conductor 15 and transformers 58 and 59.

Assuming that the ground 34 has been removed and the section 4 repaired, and that it is desired to reconnect the section into the system, this may be accomplished as follows:

The control switch 20 is first thrown to position $a$, in which position a circuit is established from transformer 58ª, through conductor 66, switch 19, conductor 67, switch 21, conductor 68, contact terminals 69 of switch 20, conductors 70 and coil 71 of a relay switch 72 to ground. The relay switch 72, when energized, completes a circuit from one terminal of storage battery 30, through conductor 73, coil 74 of relay switch 24, conductor 75, relay switch 72, conductor 76, coil 77 of relay switch 24 and conductor 78 to the opposite terminal of the battery 30. When the coils 74 and 77 are energized, the relay switch 24 is raised and bridges contact members 79, thereby completing a control circuit from conductor 39, through conductor 46 and trip coil 47 of circuit breaker 13, as already explained. By this means, circuit breaker 13 is tripped and resistor 12 is temporarily and automatically inserted.

As already explained, the circuit-closing switch 25 will be closed as soon as the circuit breaker 13 is opened and, consequently, energy will be supplied from the feeder conductor 1, through switch 18, conductor 56 and switch 25 to the control conductor 15. Transformer 58 will, consequently, be energized and current will be supplied from its secondary winding, through conductor 60, switch 19, conductor 98, switch 21, conductor 97, contact terminals 90 of switch 20 and conductor 91 to closing coil 92 of circuit breaker 7 to ground. Circuit breaker 7 is thus closed. Energy will be similarly supplied to the closing coil of circuit breaker 8 as soon as the control switch 20, adjacent to the circuit breaker 8, is moved into position $a$.

The switches 20 are provided with centering springs 93 and, consequently, the switch must be held manually in position $a$ during the cycle of operation above described. This cycle, however, occupies a very short time.

As soon as hand-operated switch 20 is released, relay switch 72 is disengaged, relay coils 74 and 77 deënergized and relay switch 24 allowed to drop to its lower position across contact terminals 45. If then normal conditions obtain on the system, relay coil 38 is deënergized and relay switch 23 drops to bridge its terminals 80, thereby completing a circuit through closing coil 83 of breaker 13 and effecting the closure of said breaker.

If it is desired to exclude a section of the trolley line from the circuit when no overload exists, in order to make repairs or for other purposes, it is only necessary to move the control switches 20, located at the ends of the section, into position $b$, a circuit being then established from the transformer 58ª, which is continuously energized, through conductor 66, switch 19, conductor 94, switch 20, conductor 62, and trip coil 63 of the circuit breaker to ground.

Circuit breaker 7 is thus opened and correspondingly circuit breaker 8 is opened.

In some instances it may be desirable to close the circuit breakers at the end of a section without necessarily inserting the resistor 12 into the feeder circuit 1. This result may be accomplished by throwing the switch 21 into the opposite position from that in which it is normally held by spring 96 and then, at the same time, moving the control switch 20 to position $a$. Under these conditions, circuit is completed from the transformer 58ª, which is continuously energized, through conductor 66, switch 19, conductor 94, switch 21, conductor 97, contact terminals 90 and conductor 91 to closing coil 92 of circuit breaker 7. The other interrupters may be closed in the same way, if desired.

Thus it appears that the trolley sections may be cut in or out at the will of an attendant, by manipulating the proper switches at the several stations, while, at the same time, the resistance is automatically inserted in the feeder circuit before a trolley section is automatically excluded and also under normal conditions before the circuit breakers may be closed to reconnect any of the trolley sections. By reversing the positions of the switches 17, 18 and 19, closing the switch 26 and opening the switch 27, the control conductor 15 may be continuously energized, instead of the control conductor 16.

Variations in arrangement of parts and circuit connections of the system may be effected within the spirit and scope of my invention.

I claim as my invention:

1. The combination with a power-supply circuit, a plurality of work circuits independently supplied with current therefrom, and selective means for connecting and disconnecting the work circuits and the power-supply circuit, of means including a control circuit that is common to all of said work circuits for actuating said selective means and automatically limiting the current flow in the supply circuit when connecting any work circuit thereto.

2. The combination with a supply circuit, a resistor connected in series therewith, means for normally short circuiting said resistor, a plurality of work circuits, and means for selectively connecting or disconnecting said work circuits and the supply circuit, of means for automatically disconnecting said short circuiting means to the resistor when connecting any selected work circuit to the supply circuit.

3. The combination with a power-supply circuit, a plurality of work circuits, and means for independently connecting and disconnecting each of the work circuits and the supply circuit, of means for automatically limiting the current flow in the supply circuit while connecting thereto any selected one of said work circuits.

4. The combination with a power-supply circuit, a current-limiting device, a plurality of work circuits, and selective means for connecting and disconnecting said work circuits and the supply circuit, of means associated with said selective means for automatically inserting said current-limiting device in said supply circuit when connecting any one of said work circuits thereto.

5. The combination with a power-supply circuit, a plurality of work circuits, circuit interrupters located at the ends of the work circuits to connect them to the power-supply circuit, and control means for selectively actuating said circuit interrupters, of means associated with said control means for automatically limiting the current flow in the power-supply circuit just prior to connecting any work circuit thereto.

6. The combination with a power-supply circuit, a current-limiting device connected in circuit therewith, and means for normally short circuiting said device, of a plurality of work circuits independently supplied with current from said supply circuit, electrically actuated circuit breakers inserted between each work circuit and the supply circuit, a control circuit for each of said circuit breakers which is also common to said short circuiting means of the current-limiting device, and a selective switch associated with each circuit breaker for either actuating said short circuiting means just prior to actuating the associated circuit breaker or actuating said associated circuit breaker direct.

7. The combination with a power-supply circuit, a plurality of work circuits that are furnished with power therefrom, and a current-limiting resistor, of means comprising control circuits and manually-operated controllers for selectively connecting and disconnecting the work circuits to the supply circuit, and means associated with said control circuits and dependent upon the position occupied by the controllers for automatically inserting said resistor in the supply circuit.

8. The combination with a power-supply circuit, a current-limiting device, and a plurality of work circuits, of circuit interrupting devices for connecting and disconnecting the work circuits and the supply circuit, controlling devices for governing the circuit interrupting devices, and means dependent upon the position of the controlling device associated with a selected work circuit for temporarily and automatically introducing said current-limiting device in the supply circuit, whereby the current traversing the supply circuit is limited prior to and during the time when the circuit interrupting device associated with the selected work circuit is being closed.

In testimony whereof, I have hereunto subscribed my name this 31st day of Oct., 1911.

FRANK CONRAD.

Witnesses:
YASUDIRO SAKAI,
B. B. HINES.

Copies of this patent may be obtained for five cents each, by addressing the "Commissioner of Patents, Washington, D. C."